(12) United States Patent
Rastegar et al.

(10) Patent No.: US 7,233,389 B2
(45) Date of Patent: Jun. 19, 2007

(54) SYSTEM AND METHOD FOR THE MEASUREMENT OF THE VELOCITY AND ACCELERATION OF OBJECTS

(75) Inventors: Jahangir S. Rastegar, Stony Brook, NY (US); Harbans Dhadwal, Setauket, NY (US)

(73) Assignee: Omnitek Partners, LLC, Bayshore, NY (US)

( * ) Notice: Subject to any disclaimer, the term of this patent is extended or adjusted under 35 U.S.C. 154(b) by 232 days.

(21) Appl. No.: 11/003,066

(22) Filed: Dec. 3, 2004

(65) Prior Publication Data

US 2006/0119835 A1    Jun. 8, 2006

(51) Int. Cl.
*G01P 3/36*    (2006.01)
(52) U.S. Cl. .................... 356/28; 356/141.3; 356/615
(58) Field of Classification Search .................. 356/28
See application file for complete search history.

(56) References Cited

U.S. PATENT DOCUMENTS

| | | | | |
|---|---|---|---|---|
| 4,709,580 A | * | 12/1987 | Butts et al. ............... 73/178 R |
| 5,183,142 A | * | 2/1993 | Latchinian et al. ......... 194/206 |
| 6,801,313 B1 | * | 10/2004 | Yokota ........................ 356/401 |
| 7,029,031 B2 | * | 4/2006 | Moisel et al. ............... 280/735 |
| 2002/0057438 A1 | * | 5/2002 | Decker ........................ 356/601 |
| 2004/0036864 A1 | * | 2/2004 | Zhao et al. .............. 356/237.2 |
| 2004/0107482 A1 | * | 6/2004 | Picotte ............................ 2/411 |
| 2005/0213076 A1 | * | 9/2005 | Saegusa ....................... 356/28 |
| 2006/0053573 A1 | * | 3/2006 | Nottingham et al. .......... 15/36 |

* cited by examiner

*Primary Examiner*—Thomas H. Tarcza
*Assistant Examiner*—Timothy A. Brainard

(57) ABSTRACT

A method and system is disclosed for determining a flight characteristic of an object in a flight path, the flight characteristic to be determined can be the object's position while in flight, a linear velocity, a rotational velocity or an acceleration of the object. In one embodiment, the method comprises arranging a radiation source in a plane, the plane being located to intersect the flight path of the object. The radiation source irradiates the object at least at the intersection with the flight path. The object is provided with at least first and second surface features having a predetermined configuration such as, for example, equally spaced parallel lines painted on the surface of the object. Reflected radiation from the object is measured with a sensor from the surface features and a flight characteristic of the object is determined based on the measured reflected radiation and the predetermined configuration of the surface features.

20 Claims, 9 Drawing Sheets

SYSTEM AND METHOD FOR THE MEASUREMENT OF THE VELOCITY AND ACCELERATION OF OBJECTS

BACKGROUND OF THE INVENTION

1. Field of the Invention

The present invention relates generally to measurement systems and methods, and more particularly to a system and an associated method for making time-of-flight non-contact optical measurements of the velocity and acceleration of objects.

2. Description of the Prior Art

In the prior art, many applications require knowledge of the speed (i.e., linear and/or rotational velocity) and acceleration of an object that is traveling in a specified direction at one or more points along its path of motion. This occurs, for example, in the case of an object moving on an assembly line or in the case of a cylindrical object that moves along its longitudinal axis in a tube or is launched through such a tube.

Various methods for the measurement of velocity and acceleration of an object with respect to a reference system exist. One measuring method described in the prior art includes the use of inertial sensors such as accelerometers and gyroscopes which are attached to the object of interest to measure the object's linear and rotary acceleration, and thereby velocity and position. Another measuring method described in the prior art includes lasers or radar type devices, which are directed towards the object and based on the returned signal, the position, and thereby the velocity and acceleration of the object is determined. When the object has only one degree-of-freedom with respect to the reference system, such as the rotation of a shaft relative to its bearing (a rotary joint), or the sliding of a block in a linear guide-way such as a linear bearing (prismatic joint), optical encoders are very often used to measure the relative motion at the joint, i.e., the angular rotation of the shaft relative to its bearing support or the linear motion of the block relative to its guide-way. Other measuring methods, which are similar to and more sophisticated than those described hereinabove, such as laser interferometry, have also been developed for the aforementioned purposes. All existing prior art approaches, however, suffer from one or more of the following disadvantages: (1) a number of such devices can only measure linear velocity and/or acceleration. In some cases, however, such as for the case of accelerometers, one may employ a plurality of devices and thereby measure rotational acceleration; (2) many of these devices, for example accelerometers and gyroscopes, have to be mounted on the object together with all the required electronics and power sources. In many cases, this may not be feasible due to space or weight considerations, or may not be economical to mount such relatively expensive devices on the object; (3) the measuring sensors and their related instrumentations that have to be mounted on or within the object may interfere with the operation of the object; (4) it is very difficult to retrofit objects with devices that have to be mounted on or within the object; (5) sensors such as accelerometers and gyroscopes do not provide information about the initial object position and orientation and their related velocities relative to a reference system and the fixed coordinate system. This information is necessary in order to integrate the acceleration information to obtain the motion trajectory for the object.

The system and associated methods in accordance with the preferred embodiment of the present invention overcomes the disadvantages associated with those of the prior art.

SUMMARY OF THE INVENTION

It is an object of the present invention to provide a system and associated method for measuring the linear velocity and/or rotational velocity, and thereby the acceleration of an object relative to a reference system at one or more positions of the object trajectory during its motion.

It is a further object of the present invention to provide information on the velocity (linear and/or rotary) of the object at a prescribed time or event.

Yet another object of the present invention is to provide the initial absolute position and orientation and the related velocity information to accelerometers and gyros mounted on an object for the purpose of allowing such accelerometer and gyros to determine the trajectory of the object during its motion.

Yet another object of the present invention is to provide a sensory system, i.e., sensors and their instrumentation that do not require the mounting of sensors on the moving object.

A further object of the present invention is to provide sensors that are inexpensive to apply to objects that require minimal modification to an object, and do not interfere with the operation of the object.

In accordance with embodiments of this invention the above-described and other problems are overcome and the objects of the invention are realized by an optical measurement method and sensory system capable of providing information indicative of the position, velocity and acceleration of an object at a point along its trajectory. In its broadest form, the method is based on time-of-flight measurements made as surface features provided on the surface of the object pass through the field of view of one or more optical sensors (e.g., fiber optic transceivers) positioned along the intended trajectory of the object. In a preferred embodiment, to make such measurements, the object's outer surface is modified by applying a plurality of surface features (i.e., optically detectable lines of various spacing, widths and orientation, or various geometrical shapes) so as to provide contrast with the main body of the object. Such lines and geometrical shapes may be applied to the object's outer surface by painting appropriate paints onto the object's outer surface or by etching or machining the features into the outer surface of the object or by any other available technique.

The method for determining a linear velocity of an object undergoing a planar motion without rotation (i.e., an object undergoing a translational motion) and for an object rotating about an axis fixed to the object and translating parallel to the said axis, according to one embodiment, includes the steps of: arranging an optical transceiver in a fixed plane of reference, the plane being located to intersect the flight path of said object; detecting, with the optical transceiver, at least a first and a second surface feature on the object; determining time differences for arrival of reflections of the at least first and second detected surface features with the optical transceiver; and calculating an object's velocity from the determined time differences of the arrival times of the reflections and knowing, a-priori, the spacing and thickness of the applied surface features.

According to one aspect of the invention, only two surface features are sufficient to determine the average velocity of the object relative to the plane of reference in any direction for objects undergoing planar motion and for linear motion of an object rotating about a fixed axis. Similarly, only three surface features are sufficient to measure the average linear acceleration of the object relative to the plane of reference. It is noted, however, that by providing additional (i.e., redundant) surface features, additional information is provided to achieve a more accurate measurement. With redundant features, redundant measurements can be made of positions, velocities and accelerations of interest. The redundant measurements can then be averaged to reduce the effects of disturbances and measurement and calculation errors.

According to another aspect of the invention, by using different line patterns and shapes for the surface features (e.g., triangles in combination with straight lines), the rotational velocity of the object may also be measured.

According to yet another aspect, the accuracy and range of the time-of-flight measurements depends in part upon the spatial resolution of the sensor (e.g., fiber optic transceiver) and the resolution of associated timing circuits.

According to a further aspect, the surface features to be applied to the object may be realized by a plurality of laser light detectors positioned in "wells" embedded in the surface of the object of appropriate size, shape and depth. The primary function of the wells is to regulate the amount of light that reaches the detectors depending on the angle that the well makes with the incoming light. In this manner, it is possible to determine from the time-of-flight measurements the position and angular orientation of the object relative to the reference system consisting of light sources directed at the moving object, and their corresponding velocity and acceleration relative to the reference system.

A system of the invention, according to one embodiment, includes at least one optical sensor configured to make time-of-flight measurements of an object along an intended trajectory, and at least one processor for calculating the position, velocity and acceleration of the object from the recorded measurements.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DETAILED DESCRIPTION OF THE INVENTION

Methods and systems for measuring the position and velocity (linear and/or rotational velocity) and acceleration of an object at one or more positions along an object's trajectory are disclosed. The following description is presented to enable any person skilled in the art to make and use the invention. For purposes of explanation, specific nomenclature is set forth to provide a thorough understanding of the present invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

OVERVIEW

In general, the present invention is directed to making time-of-flight optical measurements (e.g., velocity, acceleration) as an object moves along its trajectory. The optical measurements are made of the object at respective points along its trajectory as it passes through the field of view of one or more radiation sources. As is well known, such radiation sources may include, for example, an optical transmitter such as a laser or an infrared transmitter such as a low-power infrared laser.

Figure 1:
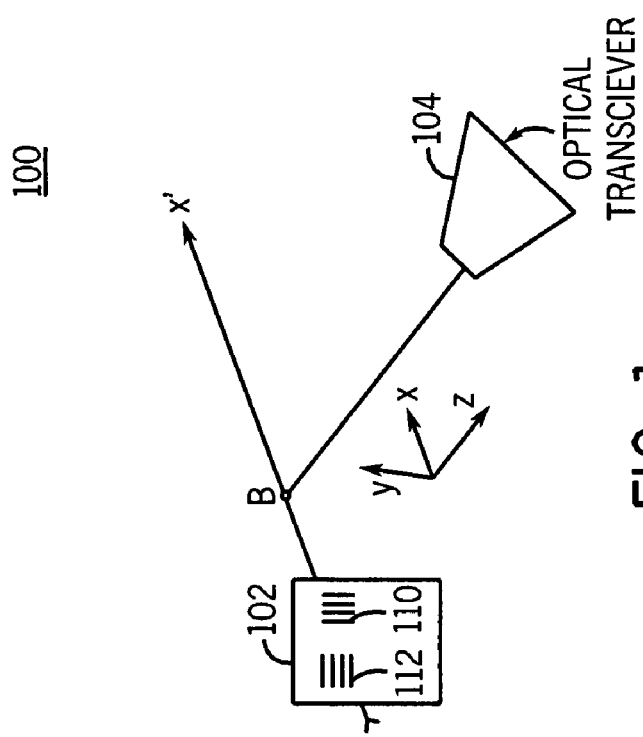
FIG. 1 is a general schematic illustration of the system of the invention.

FIG. 1 is a general schematic illustration of the system 100 of the invention, which illustrates apparatus for making the desired measurements, in accordance with one embodiment of the invention. The system 100 comprises an optical transceiver 104 capable of transmitting optical radiation (illumination) and receiving reflection measurements from an intended object 102. Preferably, the optical transceiver 104 is a laser, for example a low power infra-red laser. The light emitted from the optical transceiver 104 is a relatively narrow beam parallel to the plane YZ of the Cartesian coordinate system XYZ, in which the optical transceiver is fixed. The object 102 is considered to be translating parallel to the path X', which is orthogonal to the axis Z, constituting a planar motion along a straight line. The object 102 is modified to include on its surface one or more sets of detectable surface features (two sets of surface features in the form of a set of equally spaced parallel lines are shown in FIG. 1 at reference numerals 110 and 112). Other embodiments may include more surface features in various orientations, shapes and/or sizes, such as curved lines and various other geometric shapes as long as they follow the rules that will be described for each embodiment of this invention.

The surface features, i.e., measurement lines 110, 112 may be applied to the object 102 in a number of ways including, for example, the application of a reflective paint to provide sufficient contrast with the main body of the object 102. Alternatively, the measurement lines 110, 112 may also be applied to the surface of the object 102 by providing grooves or protruding features of various shapes into the object's surface. The grooves and protruding features may be conventionally applied by any well-known means including, for example, forming, machining, molding, and spraying forming.

An optical transceiver 104 is positioned such that its output beam intersects the object 102 at some point (e.g., point B) along the object's 102 trajectory X'. As the object 102 passes through the intersection point B, the reflection of the laser light from the surface features, i.e., measurement lines 110, 112 on the object's surface are sensed and recorded as a function of time. Because the spacing and the thickness of the measurement lines 110, 112 are known a-priori, this information in addition to determining the time difference between recorded reflections provides all the information necessary to make a time-of-flight measurement of the object 102, as will be described in greater detail further below.

Figure 2A:
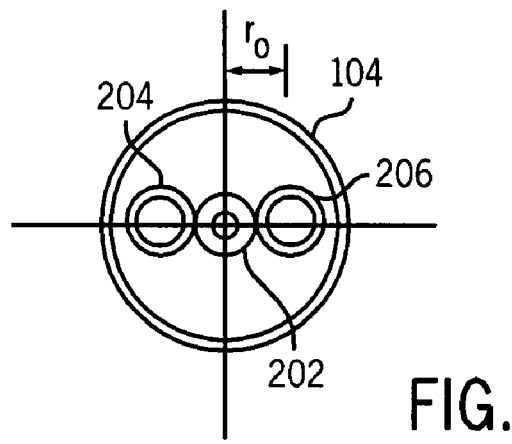
FIG. 2a is a more detailed illustration of the illuminating optical transceiver of FIG. 1 for use in embodiments of the invention.

It is to be appreciated that different embodiments employing measurement lines having different geometrical shapes may be employed to detect linear velocity, rotational velocity, position, and so on for objects undergoing rotation in their plane of translation, or for an object translating parallel to a line while rotating about a line parallel to this line, or a number of other classes of an object motion as is described below as part of different embodiments of the present invention FIG. 2a is a more detailed illustration of an optical transceiver 104 of FIG. 1, which can be used in the different embodiments of the present invention.

In FIG. 2a there is shown a cross-sectional view of transceiver 104 including an optical transmitter 202 for providing optical illumination and a first and second optical receivers 204, 206 for receiving reflected illumination. In general, only one optical receiver is necessary to detect a line or the edge of a surface feature. However, more optical receivers may be used to reduce error in the detection time due to the distance between the optical transmitter and receiver, even though this distance can be made very small by using very fine fiber optics. This is achieved, e.g., by considering the average time of receiving the peak optical signal by all the receivers to be the time at which a line or the edge of a surface feature is sensed. In certain cases, depending on the number of receivers and their distribution around the transmitter, an average distance between the transmitter and receiver has to be considered in the velocity calculations described below for various embodiments of this invention. This average distance corresponds to the average distance between the transmitter head 202 and the receivers that receive the reflected signal once the transmitted light begins to reflect the signal over the surface features of the object.

It should be appreciated that alternate embodiments may utilize components other than those shown in FIG. 2a. In particular, instead of utilizing fiber optics, the present invention contemplates the use of standard well-known optical light sources which may be transmitted/received directly or instead through a series of optical waveguide components such as, for example, lenses and mirrors, as is well known in the art of optics. With particular reference to the configuration of FIG. 2a, the transceiver shown is best applied to situations in which the surface of the object, including surface features, can be held in close proximity to the transceiver head as the object passes the transceiver.

Figure 2B:
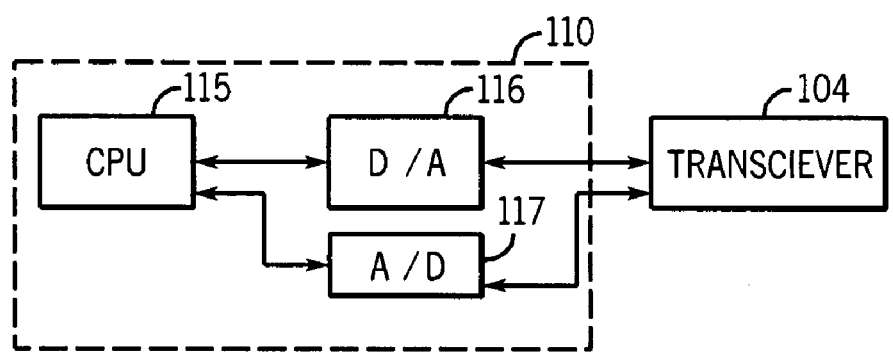
FIG. 2b is a simplified block diagram of the illuminating optical transceiver of FIG. 1 operatively coupled to a processing module.

FIG. 2b is a simplified block diagram of the optical transceiver 104 of FIG. 1 operatively coupled to a processing module 110. In one embodiment, the processing module 110 includes a central processing unit ("CPU") 115 and a Digital to Analog converter ("D/A") 116 and Analog to Digital Converter ("A/D") 117. The CPU 115 may be any microprocessor having sufficient processing power for performing the calculations of the method of the invention and for controlling the operation of the D/A & A/D 116, 117. The D/A & A/D 116, 117 can be any such device having a sufficient sampling rate and bit resolution to process the signals received from the optical transceiver 104 and the CPU 115. Other embodiments will be apparent to the skilled reader.

I. FIRST EMBODIMENT

Figure 3:
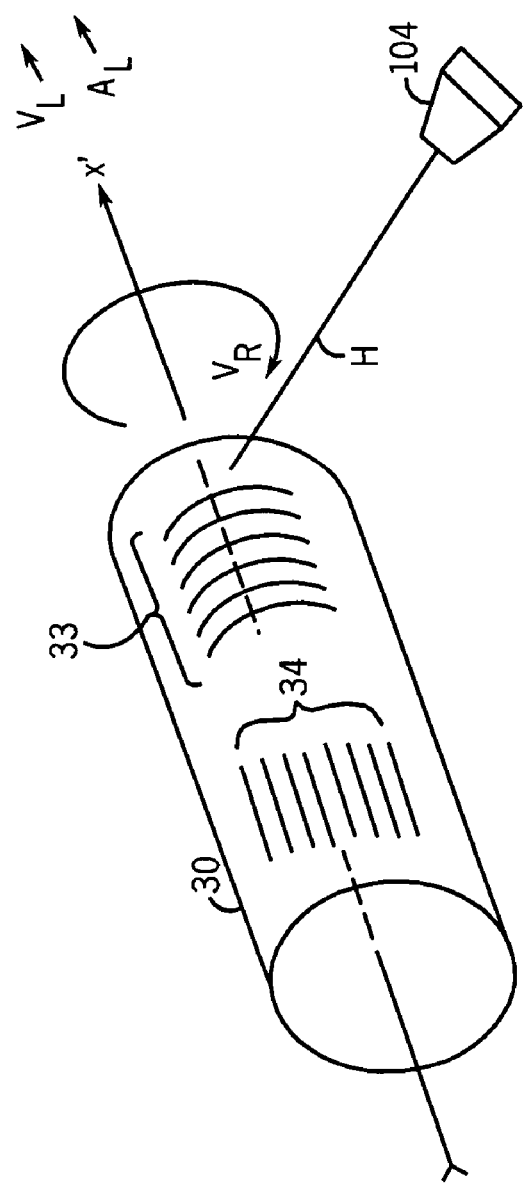
FIG. 3 illustrates a method for detecting the position, linear velocity and acceleration of a cylindrical object using a single sensor according to one embodiment of the invention.

With reference now to FIG. 3, one embodiment of the present invention is directed to the measurement of the position, instantaneous linear velocity $V_L$ and instantaneous linear acceleration $A_L$ of an essentially cylindrical object 30 that is traveling along a linear path X' while rotating about its longitudinal axis of symmetry (in this case the line X'), as well as the measurement of its instantaneous angular velocity VR about the line X'.

The first step in making a position and a time-of-flight measurement of an object 30 is to prepare the object 30 by applying (i.e., painting, etching, etc.) a plurality of linear velocity measurement lines 33 and a plurality of angular velocity measurement lines 34 to the surface of the object 30. As shown in FIG. 3, linear velocity measurement lines 33 are applied perpendicular to the direction of linear motion X'. Angular velocity measurement lines 34 are applied parallel to the direction of linear motion X'. It should be appreciated that in alternate embodiments, the plurality of lines shown, e.g., 33 may instead be implemented as a single line having a prescribed thickness including first and second edges for making reflection measurements from a radiation source.

In accordance with the method of the invention, as the modified object 30 passes through the field of view of the laser light source 104, i.e., along illumination line H, the reflection of the laser light is sensed and recorded as a function of time. Because the spacing and the thickness of the linear and angular measurement lines 33, 34 are known a-priori, the time between recorded reflections of successive lines provides the required information to calculate the linear velocity $V_L$ and linear acceleration $A_L$ of the object 30, described in more detail as follows. The position of the object along the path X' in terms of the time at which the first of the measurement lines 33 intersect the illumination line H. At this point in time, the position of the object relative to the reference system is therefore known since the illuminating source and thereby the illumination line H are fixed in the selected reference system.

As the linear velocity measurement lines 33 sequentially intersect the illumination line H, the linear velocity $V_L$ of the object 30 in the direction of motion X' may be calculated as:

$$V_L = (D_{33a-33b})/[TD_{33a} - TD_{33b}] \qquad \text{Eq. [1]}$$

where: $D_{33a\text{-}33b}$ is the distance between two adjacent velocity measurement lines (or the distance between the leading or trailing edges of two adjacent lines when the lines have a considerable thicknesses), known a-priori; $TD_{33a}$ is the time of detection of velocity measurement line 33a; and $TD_{33b}$ is the time of detection of velocity measurement line 33b.

The velocity $V_L$ is obviously the average linear velocity of the object along the path of motion X' between the times $TD_{33a}$ and $TD_{33b}$. The average velocity $V_L$, however, approaches its instantaneous value as the distance between the lines and the thickness of the lines, i.e., the distance $D_{33a\text{-}33b}$ approaches zero. The distance traveled and time information as several lines 33 intersect the illumination line H can be used to similarly determine the velocity $V_L$ at different positions of the object relative to the reference system. The information may also be used to find the average velocity of the object over a longer range of its travel by averaging two or more of the calculated average velocities $V_L$, which has the advantage of canceling the effects of measurement and environmental noise, variations and inaccuracies in the straightness and uniform thickness of the lines 33, slight deviations in the straight line motion of the object and its wobbling about the linear path of its motion, in the numerical calculation and other similar errors.

From two consecutive velocity measurements and time elapsed in between two measurements, the average acceleration of the object can be calculated as:

$$A_L = (V_{L1} - V_{L2}) / TD_{33a\text{-}c} \qquad \text{Eq. [2]}$$

where: $V_{L1}$ is a first linear velocity measurement, e.g., for between the lines 33a and 33b; $V_{L2}$ is a second linear velocity measurement, e.g., for between the lines 33b and 33c; and $TD_{34a\text{-}b}$ is the time elapsed between the first and second velocity measurements.

As the object 30 continues its travel along its linear path of motion X', the angular velocity measurement lines 34 begin to intersect the illumination line H. If the time between two such intersections is $TR_{1\text{-}2}$, the average angular velocity of the object 30 about its axis of rotation X' is calculated as:

$$VR_1 = \theta_{12} / TR_{1\text{-}2} \qquad \text{Eq. [3]}$$

Where $\theta_{12}$ is the angle corresponding to the arc of the circle (that a plane of intersection normal to the axis of rotation X' would make with the cylindrical object 30) between the two intersected lines 34. As previously described for the linear velocity measurement using the lines 33, if the lines 34 have a considerable thickness, then the thickness of the lines have to be similarly considered in the measurement of the time interval $TR_{1\text{-}2}$ and the angle $\theta_{12}$.

One noted drawback with the above embodiment of the present invention is that the direction of rotation cannot be determined. In many applications, the direction of rotation is known and does not need to be determined, or the rotational velocity and not the direction or rotation is not needed to be known, or that the direction of rotation is determined using some other sensory information. Otherwise, this drawback may be overcome using one of the certain surface features, as described in the second embodiment of this invention. Alternatively, another sensory information may be used to determine the direction of rotation, such as transceivers 104 with two receivers 204 and 206, positioned substantially perpendicular to the axis of rotation X', so that one receives the signal first if the object is rotation in a clockwise direction and the other receives the signal if the object is rotating in the counterclockwise direction about the axis of rotation X'.

In general, the object 30 does not have to be cylindrical for the present system to measure its linear position, velocity and acceleration of the object along the line X' and its angular velocity and acceleration about an axis of rotation that is parallel to the line X'. In such cases, the lines 33 and 34 are placed similarly on the object parallel and perpendicular to the line X'.

It should be noted that for this and the following embodiments of this invention, the linear and rotational velocities of the object are considered to be constant during their measurement using the present optical method, and yield an average of such velocities. The accuracy of the measurement can obviously be increased by decreasing the size of the surface features, e.g., the width of the lines must be made as small as possible and the lines must be placed as close to each other as possible, as long as they are compatible with the size of the illuminating light beam and detectable by the receiving detector.

II. SECOND EMBODIMENT

In the second embodiment, alternative surface features are illustrated which can be used to measure both linear and rotational velocity of a cylindrical object translating parallel and rotating about its centerline.

The success of the present embodiment depends upon the application of appropriate combination of surface features to the object 30. The present embodiment will be described with reference to FIGS. 4a and 5. In all the cases presented for the present embodiment.

Figure 4A:
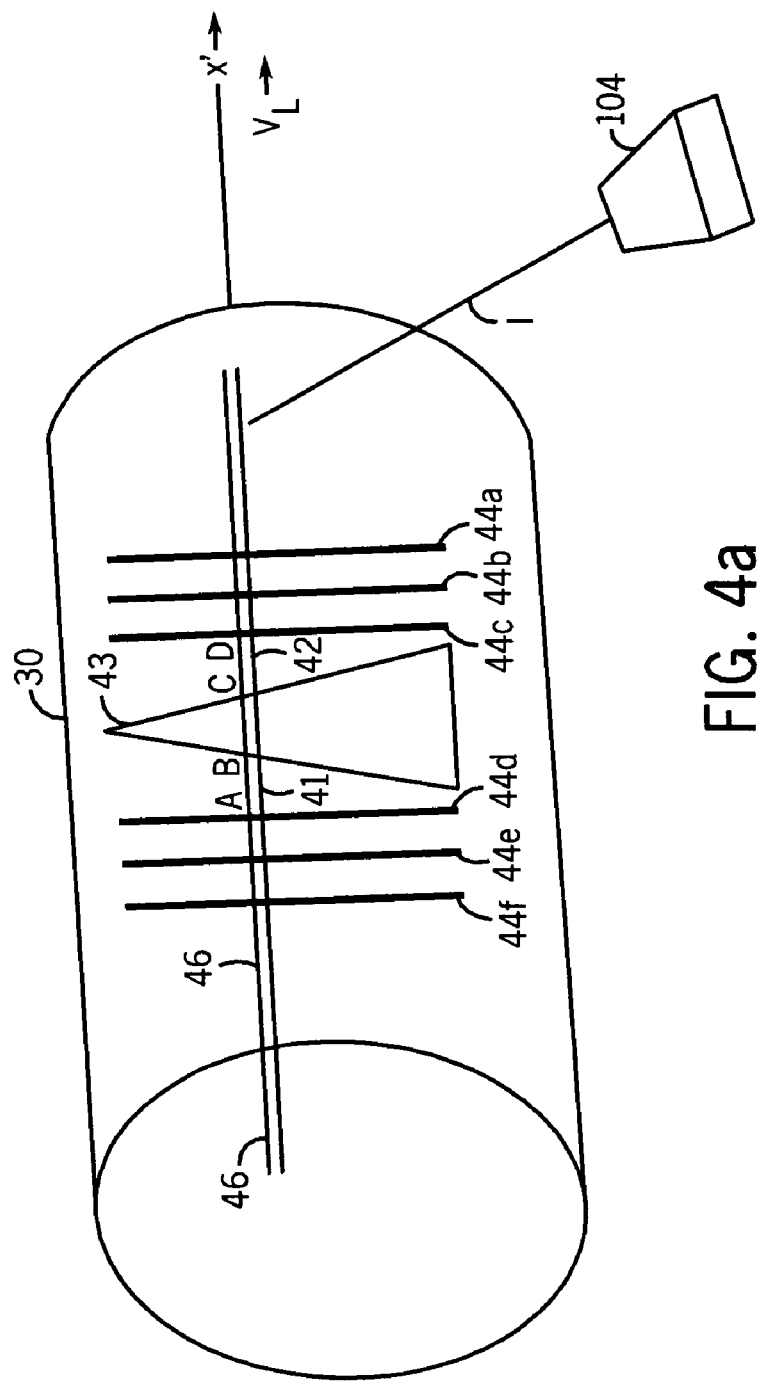
FIG. 4a illustrates a method for detecting the position, linear velocity and acceleration of a cylindrical object using a single sensor according to one embodiment of the invention.

With reference first to FIG. 4a, the object 30 is first prepared or modified by applying a surface feature in the form of an equilateral triangle 43, and lines 44a–c and lines 44d–f to the surface of the object 30 to measure the linear velocity $V_L$ and rotational velocity $V_R$ of the object. As shown, the measurement lines consist of a centrally positioned equal sided triangle 43 and two sets of measurement lines 44a–c, 44d–f. As shown, measurement lines 44a–c are positioned to one side of the centrally positioned triangle 43 and measurement lines 44d–f are positioned on the opposite side of the triangle 43.

A laser spot tracing line is shown in FIG. 4a, i.e., illumination line I, which represents an imaginary scanning line of illumination as applied by transceiver 104. Illumination line I scans across the applied surface features of the object 30 as the object 30 moves in the direction of linear motion X'. As the object 30 travels parallel to the line X', the illumination line I intersects the applied surface features of the object 30 in the following order: illumination line I intersects the line 44a, then the line 44b and then the line 44c at point D. The illumination line then intersects the closer side of the triangle 43 at points C and its opposite side at the point B The illumination line I then intersects the line 44d at the point A, and then the line 44e and then the line 44f.

In the case of FIG. 4a, since the equilateral triangle 43 is positioned centrally between the lines 44c and 44d, the rotational speed of the object 30 is determined to be zero (no rotation) since the line segments (A-B) 41 and (C-D) 42 are of equal length. As a result, the measured length of time corresponding to the traced lengths (A-B) 41 and (C-D) 42 are equal, indicating that the rotational speed of the object about the line X' is zero.

Figure 5:
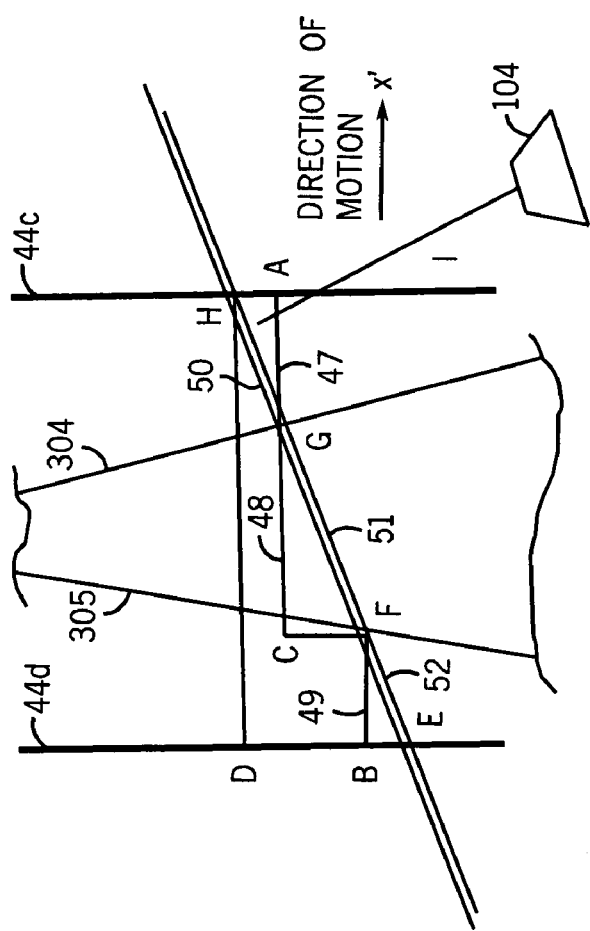
FIG. 5 illustrates a method for detecting the position, linear velocity, acceleration and counterclockwise rotation of a cylindrical object using a single sensor according to one embodiment of the invention.

FIG. 5 illustrates the case where the object 30 is also undergoing a clockwise rotation z' about the line X'. As the object 30 travels along the line X', the illumination line I intersects the surface features in the following order: illumination line I first intersects the line 44a, then the line 44b, and then the line 44c at point H, then the closer side of the triangle 43 at points G and its opposite side at the point F, followed by intersections of the line 44d at point E, then the line 44e and then the line 44f. The downward direction of the line 46 traced by the illuminating beam I on the surface of the cylindrical object 30 indicates that the object 30 is undergoing a clockwise rotation z' about the line of the X' of the object as viewed from the front of the object 30. Since the object 30 is undergoing a clockwise rotation about the line X' and since the linear and rotational velocities of the object are considered to be nearly constant during the present measurements, the length of the line EF is smaller than the length of the line GH, and similarly, the time taken for illumination line I to travel the segment EF is smaller than the time that it takes to travel the segment G-H.

Conversely, if the object 30 is instead rotating in a counterclockwise direction about the line X' as viewed from the front of the object 30, the time taken for illumination line I to travel the segment EF would be longer than the time it takes to travel the segment GH. Thus, it is shown that by comparing the times taken along the segments EF and GH, the direction of rotation may be determined.

Having determined that the object 30 is traveling in one of a clockwise or counterclockwise direction, it is then required to determine the linear velocity $V_L$ and the rotational velocity $V_r$ of the object 30. To do so, it is first required to calculate the linear velocity of the object 30. This can be done by measuring the time taken for measurement lines 44a–c to intersect the illumination line I, as described above with reference to the first embodiment. It is noted that a more accurate measurement of the linear velocity $V_L$ may be obtained by also measuring the time taken for the measurement lines 44d–f to intersect the illumination line I and averaging the two velocities.

Having determined the (average) linear velocity $V_L$ of the object 30, the (average) rotational velocity $V_R$ of the object 30 and the corresponding (average) angular position of the object 30 in the reference system fixed to the transceiver 104 may then be obtained from the available geometrical information as follows, irrespective of the direction of rotation of the object 30.

The line 46 intersects the line 44c at the point H, the sides of the triangle 43 at the points G an F, and the line 44d at point E. Since the linear velocity $V_L$ of the object 30 and the time of travel between the intersection points G and H are known, the distance 301 (in the direction of the line X') between the line 44c and line 304 (parallel to the line 44c and passing through the point G) is readily calculated. Similarly, from the linear velocity $V_L$ and the time of travel between the points F and E, the distance 302 (in the direction of the line X') between the point E and line 305 (parallel to the line 44d and passing through the point F) is readily determined. Having determined the distances 301 and 302, the points G and F are uniquely identified on sides 306 and 307, respectively, of the triangle 43.

The time taken for the beam I to travel from the intersection point H to the intersection point E is readily determined from the linear velocity $V_L$ from the known distance between the lines 44c and 44d. The angle 303 that the line 46 makes with the line X', and thereby the distance of the arc EP traveled due to the rotation of the object about the line X' are determined. The angular rotation of the cylindrical object 30 corresponding to the arc EP is then determined from the know radius of the cylindrical object 30. By dividing this angle by the time of travel of the beam I from the point H to the point E, the average angular velocity of the object 30 is determined.

In addition, the (average) angular position of the object 30 relative to the aforementioned reference system is uniquely determined, since the position of the triangle 43 is uniquely determined with respect to the position of the beam I at any point in time once the position of the points F and G have been determined uniquely on the sides 306 and 307, respectively, of the triangle 43.

It is noted that even though in FIGS. 4a and 5 the triangle 43 is positioned central to the lines 44c and 44d, this is not required to perform the above rotational position and velocity measurements. In fact, the triangle may also not be equilateral and positioned arbitrarily between two parallel lines. In fact, the surface feature may have any appropriate shape and any number of lines 44a–c and 44d–f may be used and the lines do not have to be in planes perpendicular to the axis of rotation (symmetry) X' (i.e., they do not have to be parallel and a circular arc of full circles). The only requirement for the surface features, including lines, is that the line traced by the illuminating beam I intersect the surface features in a unique manner so that the desired linear and angular positions, velocities and accelerations could be uniquely determined.

The linear acceleration of the object 30 is determined as previously described for the first embodiment of the present invention. The rotational acceleration of the object cannot, however, be determined using only one triangular surface feature and requires at least two such triangular surface features positioned as close to each other as possible along the length of the cylindrical object 30, and positioned between two parallel lines.

It is noted that for the linear and rotational motions described above with reference to FIGS. 4a and 5, more than one optical transceivers may be used in an alternate embodiment to obtain redundant information to increase the precision of the measurements. Further, different optical transceivers may be used to scan different groups of lines. However, while redundancy may be provided by increasing the number of optical transceivers, redundancy is preferably provided instead by increasing the number of lines or the number of groups of lines to be scanned. In certain situations, however, it may be desirable to minimize the length of scan along the length of the cylinder and as a result the number of scan lines is bounded to the minimum thickness of the lines and the minimum that could be tolerated by the employed transceiver and the data acquisition system. This situation could arise, for example, where the length of the object or the space available for providing the lines or other indicia is limited. Another situation where it may be desirable to minimize the length of scan resulting in a restricted number of scan lines is where the linear and/or rotational accelerations are high and therefore it becomes desirable to average velocities over the shortest possible length of travel.

It is noted that in FIGS. 4a and 5, the surface lines 44a–c and 44d–f and the triangle 43 are shown to cover only a portion of the periphery of the cylindrical object 30 for the sake of simplicity. However, if the object makes a full rotation about its axis of rotation X', the above lines and triangle must make a complete turn around the cylindrical object 30 so that independent of the angular position of the object about the axis X', the scanning line 46 intersects an appropriate number of lines and triangle(s), i.e., surface features, to make it possible to determine the angular and linear position (if desired) and velocity and acceleration of object relative to the reference system in which the optical transceivers are affixed. It should also be noted that in general, the larger the angle of the tip 308 of the triangle, FIG. 5, and the farther the triangle 43 is from the lines 44c and 44d, the more accurate the angular position and velocity measurements become. This is the case since the time and distances of travel from the point H to G, G to F, and F to E are generally increased, thereby yielding a more precise average angular position and velocity calculation. There is, however, a drawback to making the above distances and the triangle tip angle too large since the average linear and angular position, velocity and accelerations are then averaged over a larger range of the motion of the object 30. This could be a problem if the motion of object 30 is varying rapidly, e.g., if the linear and/or angular accelerations of the object is relatively high when it passed through the present optical measurement station, and provide average position, velocity and acceleration values that are significantly different from their instantaneous values. It is therefore advisable to select appropriately shaped and positioned surface features including lines and their thickness, etc., to match each specific application and accuracy requirements.

It is also appreciated that aforementioned linear and rotary position, velocity and acceleration measurements may be made at more than one such optical measurement stations to provide information about the time history of linear and rotary motion of the cylindrical object along its path of motion.

It is also noted that the object 30 does not have to be cylindrical and may be of various shapes but traveling parallel to a line X', and rotating about an axis parallel to the line X'. The only requirement will then be that the surface features be visible to the beam I at the measurement station, the full geometry of the object be known, and that the line (curve) 46 being traced over the surface of the object as it passes through the measurement station intersect the surface features in a unique way (or a limited number of ways that could be identified using the signals received by the different receivers—such as the two receivers 204 and 206 in FIG. 2a or some other sensory information).

III. THIRD EMBODIMENT

The third embodiment is directed to determining the linear and rotary position, velocity and acceleration of an object of arbitrary shape undergoing planar motion.

Figure 6:
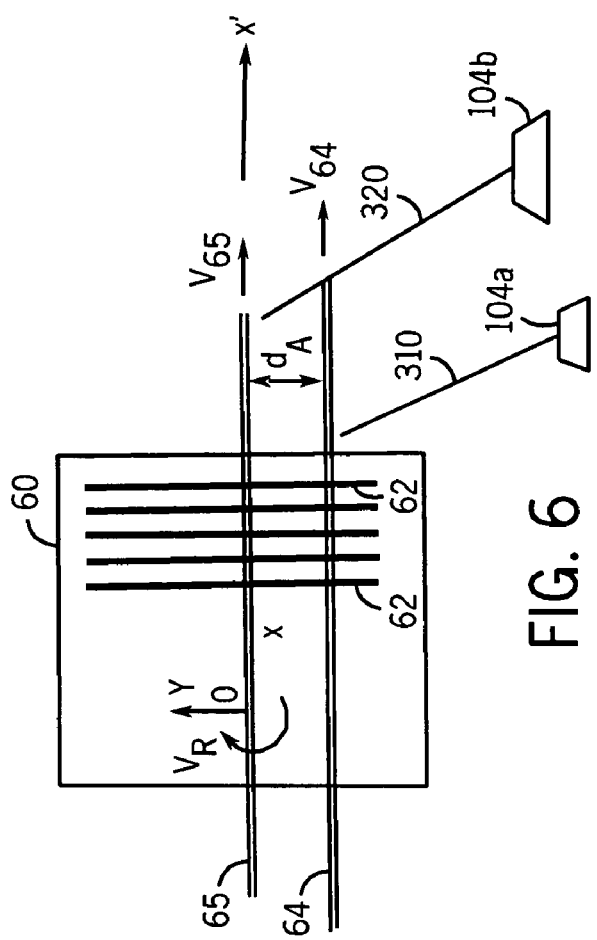
FIG. 6 illustrates a method for detecting the linear and/or rotational velocity of an object of arbitrary shape moving in the XY plane.

With reference now to FIG. 6, object 60 is considered to be undergoing a planar motion. The Cartesian XYZ coordinate system is fixed to the object 60. The planar motion of the object 60 is considered to be parallel to the XY plane of the XYZ coordinate system.

In the first case of this embodiment, the object 60 is considered to be undergoing a linear translation. Without the loss of generality, the linear motion of the object 60 is considered to be parallel to the direction of the X-axis of the XYZ coordinate system.

A shown in FIG. 6, there are shown a plurality of equally spaced parallel lines 62 on the surface of object 60. The lines 62 may or may not be perpendicular to the path of motion, i.e., perpendicular to the X-axis. The linear velocity $V_{65}$ relative to a reference system is determined using an optical transceiver 104b, which is fixed in the said reference system. The velocity $V_{65}$ is determined by measuring the time taken for the beam 320 emitted from the transceiver 104b to intersect two or more consecutive lines 62 and the known distance between the two intersected lines 62. The velocity $V_{65}$ is then calculated by dividing the said distance between the two intersection points by the said time of travel from between the two intersection points. If the lines 62 are not perpendicular to the X-axis, i.e., the linear path of motion, then the distance between the two intersection points along the scanning line 65 (which is readily calculated from the known distance between the lines 62 and the angle that the lines 62 make with the direction of motion) must be used to calculate the linear velocity of the object, $V_{65}$. The transceiver 104b does not obviously have to be placed such that the scanning line 65 pass through the center O of the coordinate system. In addition, more than two lines 62 or more than one transceiver 104b may be used to obtain redundant, thereby more accurate average velocity measurements. The position of the object is also known at each time when the scanning line 65 intersects one of the lines 62. The acceleration of the object along its linear path of motion is calculated as described for the previous embodiments of the present invention.

Now consider the case in which the object 60 is also rotating about an axis parallel to the Z-axis of the XYZ coordinate system (Z-axis being perpendicular to the XY plane) while undergoing a linear translation. For the sake of simplicity and without any loss in generality, let the motion of the object 60 be described by the linear motion of the origin of the XYZ coordinate system O with a velocity $V_{65}$, and the rotation of the object about the Z-axis with a velocity $V_R$. With this embodiment of the present invention, the linear velocity $V_{65}$ and the angular velocity $V_R$ of the object are measured as follows.

The linear velocities $V_{65}$ and $V_{67}$ of the object 60 along the linear path of motion 65 of its center of rotation O and along a parallel path 64 positioned a distance $d_A$ from the line 65 are measured using two transceivers 104a, 104b. In this configuration, the transceiver 104b is used to measure the linear velocity $V_{65}$ of the object 60 along the line 65 traced by the beam 320 emitted by the transceiver. Similarly, the transceiver 104a is used to measure the linear velocity $V_{67}$ of the object 60 along the line 67 traced by the beam 310 emitted by the transceiver. The velocities $V_{65}$ and $V_{67}$ are measured in a manner similar to that described for the previous embodiments by measuring the time taken for the beams 310 and 320 to move from one point of intersection with the lines 62 to the other and the spacing between the lines 62. If the traced lines 64 and 65 are not perpendicular to the lines 62 at the time of these measurements, then the angle between the two sets of lines is used to determine the distance traveled by the beams 310 and 320 from one point of intersection with the lines 62 to the other along the lines 64 and 65).

The rotational velocity $V_R$ of the object 60 is then calculated from the difference between the linear velocity of the origin O of the XYZ coordinate system $V_{65}$ and the velocity of the $V_{67}$ of the object at a distance $d_a$, FIG. 6, as $$V_R = (V_{65} - V_{67})/d_a \qquad \text{Eq. [4]}$$

As can be observed in FIG. 6, if the velocity $V_{65}$ is greater than the velocity $V_{67}$, then the rotational velocity $V_R$ is clockwise about the axis of rotation (Z-axis) as shown in FIG. 6. Otherwise the rotational velocity $V_R$ is counterclockwise about the axis of rotation.

Similar to what was previously described, the surface features 62 may have different thickness, may be curves of various shapes, or surface features of different shapes. The only requirement, however, is that they provide a unique time intervals and traveled distances for calculating the corresponding velocities. In practice, however, it is desirable to use parallel lines and triangles to simplify the required calculations.

In general, an object undergoing planar motion has three degrees-of-freedom, i.e., two displacements in two independent directions in the plane of motion and a rotation about an axis perpendicular to the plane of motion. For the special case of planar motions consisting of translation along a certain path and rotation in the plane of motion (as is the case for this embodiment of the present invention), the number of degrees-of-freedom is reduced to two. Its linear and rotational position, velocity and acceleration may therefore in general be determined with two independent position or velocity or acceleration measurements systems (e.g., by the optical transceivers 104a and 104b and the lines 62), as shown in FIG. 6 and described above. By using surface features of various shapes, e.g., the triangular shapes and lines used for the case of the above second embodiment, only one such optical transceiver is needed to measure both the linear and angular position and velocity of the object 60, i.e., to make the required two independent position and velocity measurements. The utilization of an additional optical transceiver would therefore provide the third independent position and velocity measurement so that the position and angular orientation and the corresponding velocities of the object 60 undergoing arbitrary translation (requiring two independent position and velocity measurements) could be determined.

Also, redundant information may be employed, as described above, to improve the measurement precision.

IV. FOURTH EMBODIMENT

Figure 7:
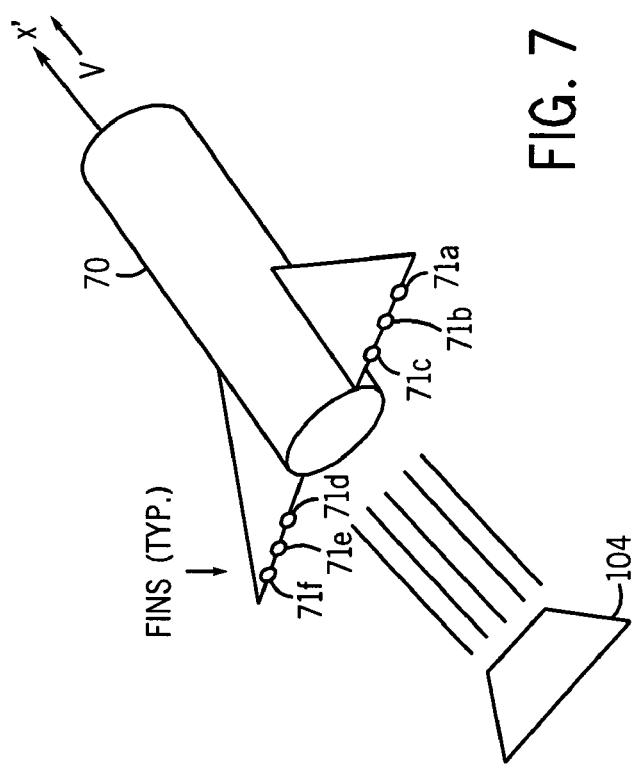
FIG. 7 illustrates a method for detecting the orientation of a projectile relative to the general direction of the projectile's motion using a plurality of laser light detectors positioned in "wells" embedded in the surface of the projectile in a first configuration.
Figure 8:
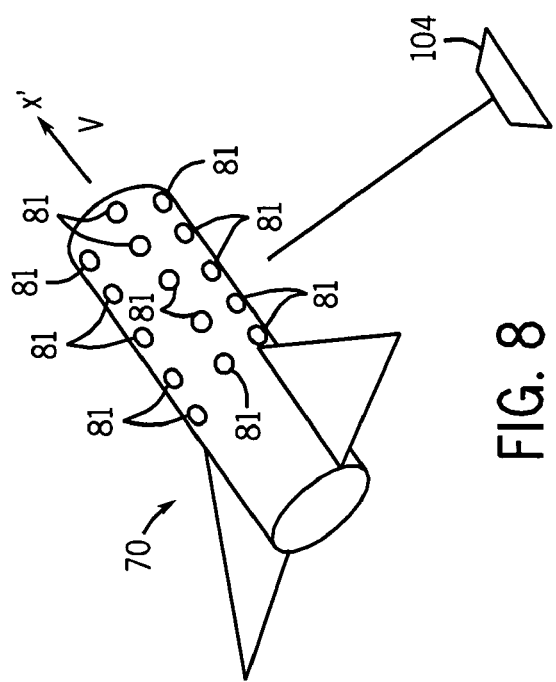
FIG. 8 illustrates a method for detecting the orientation of a projectile relative to the general direction of the projectile's motion using a plurality of laser light detectors positioned in "wells" embedded in the surface of the projectile in a second configuration.
Figure 9:
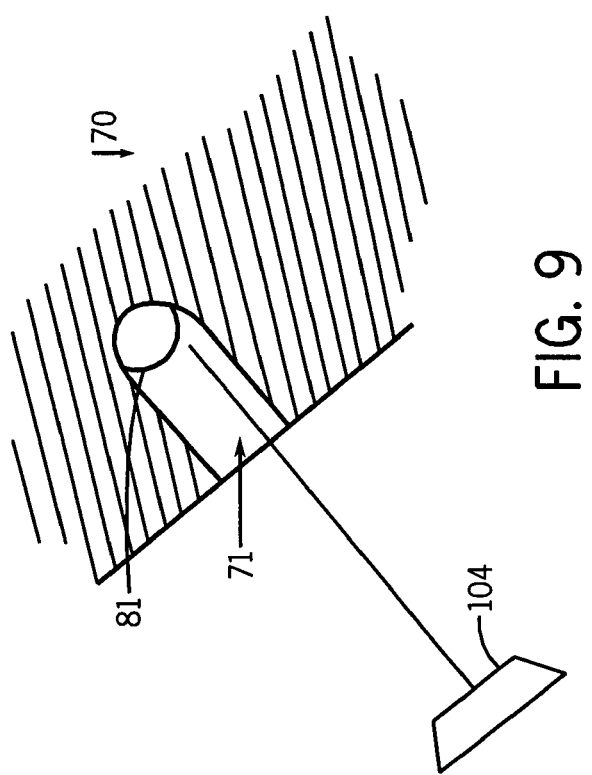
FIG. 9 illustrates a cross-section across a typical "well" embedded in the surface of a projectile and the laser detector shown in the configurations of FIGS. 7 and 8.

With reference now to FIGS. 7–9, one exemplary application of the principles of the invention is the measurement of the orientation of a projectile relative to the general direction of the projectile's motion. Specifically, there is shown a projectile 70 moving with a velocity V in a general direction of motion X'. The projectile includes a plurality of laser light detectors 71a–f positioned in "wells" embedded in the surface (in this case the fins) of the projectile 70 of appropriate size, shape and depth. The primary function of the wells is to regulate the amount of light that reaches the detectors 71a–f, from light source 104, depending on the angle that the wells make with the incoming light. A maximum amount of light will be received in the wells in the case where the light rays are parallel to the long axis (i.e., the depth) of the wells. The laser light detectors 71a–f send signals indicative of the relative level of light that each receive to a processor onboard the projectile 70, which from the available position and orientation of each diode, can determine the orientation of the projectile 70 with respect to the direction of illumination of the laser light source, i.e., with respect to the reference system in which the light source 104 is fixed. The measurement accuracy may be significantly enhanced by employing polarized laser light source(s) and polarization sensitive diode detectors, taking advantage of the polarization mismatch between the two. It should be noted that when the light source emits a polarized beam, a diode detector facing it would output maximum signal when it is oriented (about the line of sight of the illuminating source) in the direction of matched polarity. As the diode detector is rotated about the line of sight, its output decreases, approaching zero when it has been rotated 90 degrees. The above characteristics of polarized laser light sources and detectors is well known in the art of optics.

It is generally preferred for the detector 71a–f wells to be filled with a filling material (not shown) such as the customarily used potting epoxy which is transparent to the laser light being used to prevent the wells being filled with dust and dirt, prevent the deterioration of the detectors due to environmental conditions, and also minimally affect the aerodynamics of the projectile. Referring now to FIG. 8, there is shown in another exemplary configuration of laser light detectors. As distinguished from the placement of light detectors in the tail end of the projectile, as illustrated in FIG. 7, in the present configuration, the laser light detectors 81 are disposed on an outer surface of the projectile 70, and still in the aforementioned wells. The light detectors 81 are identical to those described above with the only distinction being their placement. The projectile 70 is assumed to be moving with a velocity V in a general direction of motion X'. The light source 104 is preferably directed perpendicular to the side surfaces of the projectile 70. By analyzing the pattern of detected light, i.e., determining the variation of the collected light intensities over the set of detectors 81 and knowing a-priori the orientation of the detector wells, the orientation that the projectile 70 makes with the light source 104, i.e., with respect to the reference system in which the light source 104 is fixed, may be determined using simple geometrical analysis tools. It is noted that in general, and by disturbing large enough number of detectors with appropriate well opening size and well depth such that at each instant in time at least three independent orientation measurement information could be measured, then full orientation of the projectile, i.e., elevation, roll and azimuth can be determined while the projectile is in the field of view of the laser light source 104. By making the orientation measurement at small enough time intervals while the projectile is in the field of view of the laser light source 104, the related angular velocities and accelerations may also be determined. One advantage of placing the light detectors 81 on an outside surface of the projectile 70 is that the actual position of the projectile 70 can also be determined at the time of measurement. It is further noted that the measurements can be made at continuous or discrete time intervals. It should be appreciated that placing a larger number of detectors as far apart as possible provides a more precise measurement of orientation. In addition, by placing more laser light sources 104 along the path of travel of the projectile, the same measurements can be made at when the projectile is in the field of view of those illuminating sources. In general, polarized laser light sources and detectors may be used, which would make the measurements more accurate as described for the projectile of FIG. 6.

In conclusion, it has been shown that the present invention advantageously allows for the measurement and calculation of the position, velocity and acceleration of an object (e.g., projectile) traveling at high rates of speed in a controlled or uncontrolled environment.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for determining a flight characteristic of an object in a flight path, the flight characteristic being at least one of a position, a linear velocity, a rotational velocity, and an acceleration, the method comprising:

arranging a radiation source in a plane, the plane being located to intersect the flight path of the object, the radiation source irradiating the object at least at the intersection with the flight path;

providing at least first and second surface features on the object, the at least first and second surface features having a predetermined configuration;

measuring, with a sensor, reflected radiation from the at least first and second surface features; and determining the flight characteristic based on the measured reflected radiation and the predetermined configuration;

wherein at least one of:

said first surface features comprise a plurality of equally spaced parallel measurement lines applied to a surface of said object oriented parallel to said flight path;

said second surface features comprise a plurality of equally spaced parallel measurement lines applied to a surface of said object oriented perpendicular to said flight path; and said at least second surface features comprise a plurality of equally spaced parallel measurement lines applied to a surface of said object, said measurement lines oriented perpendicular to said flight path.

2. The method of claim 1, wherein said flight characteristic is determined at one or more positions of said object's flight path.

3. The method of claim 1, wherein said radiation source is an optical transmitter operable to transmit optical radiation.

4. The method of claim 3, wherein the optical transmitter is a laser.

5. The method of claim 1, wherein said radiation source is an infrared transmitter operable to transmit infrared radiation.

6. The method of claim 5, wherein the infrared transmitter is a low-power infrared laser.

7. The method of claim 1, wherein said at least first and second surface features are grooves embedded within said object's surface.

8. The method of claim 1, wherein said at least first and second surface feature are reflective paint applied to the surface of said object.

9. The method of claim 1, wherein said determining step further comprises calculating a velocity flight characteristic of said object in accordance with the following equation:

$$V_L = D_{a-b}/[TDa - TDb]$$

where:

$D_{a-b}$—is the physical distance between said two adjacent equally spaced parallel measurement lines;

$TD_a$—is the time of detection of said incident illumination reflected from a first measurement line; and $TD_b$—is the time of detection of said incident illumination reflected from a second measurement line.

10. The method of claim 1, wherein said determining step further comprises calculating said object's position during flight by determining a time at which a first measurement line included among said first surface feature on said object is intersected by an illumination line emitted by said radiation source.

11. The method of claim 1, wherein said determining step further comprises calculating an acceleration flight characteristic of said object in accordance with the following equation:

$$A_L = (V_{L1} - V_{L2})/TD_{1-2}$$

where:

$V_{L1}$—a first linear velocity measurement, $V_{L2}$—a second linear velocity measurement, and $TD_{1-2}$—the time elapsed between the first and second linear velocity measurements.

12. The method of claim 1, wherein said determining step further comprises calculating an average angular velocity flight characteristic of said object in accordance with the following equation:

$$VR_1 = \theta_{12}/TR_{1-2}$$

where:

$\theta 12$—is the angle corresponding to the arc of the circle that a plane of intersection normal to the axis of rotation X' would make with a cylindrical object between two angular velocity measurement lines, and $TR_{1-2}$ an elapsed time interval between the two intersected lines.

13. The method of claim 1, wherein said detecting step further comprises illuminating said first and second surface features with incident energy from said radiation source, wherein said energy is reflected from portions of said first and second measurement surface features.

14. The apparatus of claim 13, wherein the radiation source is an infrared transmitter and the receiver is an infrared receiver.

15. A method for determining a flight characteristic of an object in a flight path, the flight characteristic being at least one of a position, a linear velocity, a rotational velocity, and an acceleration, the method comprising:

arranging a radiation source in a plane, the plane being located to intersect the flight path of the object the radiation source irradiating the object at least at the intersection with the flight path;

providing at least first and second surface features on the object, the at least first and second surface features having a predetermined configuration;

measuring, with a sensor, reflected radiation from the at least first and second surface features; and determining the flight characteristic based on the measured reflected radiation and the predetermined configuration;

wherein said at least first and second surface features are protrusions on the surface of said object.

16. A method for determining a rotational speed of an object as the object moves in a direction of linear motion, comprising the steps of:

arranging at least one transceiver in a plane, said plane being located to intersect said flight path of said object;

detecting, with said at least one transceiver, in order, a first, a second and a third surface feature on said object, wherein said first and third surface features are straight lines perpendicular to the direction of motion and said second surface feature is a two-dimensional geometric feature;

determining time differences for arrival of reflections of said first, second and third detected surface features with said at least one transceiver; and calculating said rotational speed from said determined time differences and from a geometry of said first, second and third surface features.

17. A method for determining the linear velocity and rotational velocity of an object of arbitrary shape, comprising:

arranging a first transceiver in a first plane, said first plane being located to intersect said flight path of said object along a first tracing line passing through the center of said object;

arranging a second transceiver in a second plane, said second plane being located to intersect said flight path of said object along a second tracing line being a distance D from said first ray tracing line;

determining a first linear velocity of said object along a first tracing line, determining a second linear velocity of said object along a second tracing line; and calculating said rotational velocity from of said object as the difference between said first and second linear velocities.

18. Apparatus for determining, without contact, at least one of a position, a velocity, and an acceleration of an object in a flight path, said apparatus comprising:

at least one radiation source and corresponding receiver arranged in a first plane, said first plane being located to intersect said flight path of said projectile;

means for illuminating with said radiation source, at least a first and a second surface feature on said object;

means for detecting, with said receiver, at least a first and a second surface feature on said object;

means for determining time differences for arrival of reflections of said at least first and second detected surface features with said receiver; and means for calculating a flight characteristic from said determined time differences and a known spacing of said at least first and second detected surface features;

wherein at least one of:

said first surface features comprise a plurality of equally spaced parallel measurement lines applied to a surface of said object oriented parallel to said flight path;

said second surface features comprise a plurality of equally spaced parallel measurement lines applied to a surface of said object oriented perpendicular to said flight path; and said at least second surface features comprise a plurality of equally spaced parallel measurement lines applied to a surface of said object, said measurement lines oriented perpendicular to said flight path.

19. The apparatus of claim 18, wherein the radiation source is an optical transmitter and the receiver is an optical receiver.

20. A projectile comprising:

a casing having at least first and second surface features provided on a surface thereof for reflecting radiation from a source to a sensor, the at least first and second surface features having a predetermined configuration;

wherein at least one of:

said first surface features comprise a plurality of equally spaced parallel measurement lines applied to a surface of said object oriented parallel to a flight path;

said second surface features comprise a plurality of equally spaced parallel measurement lines applied to a surface of said object oriented perpendicular to said flight path; and said at least second surface features comprise a plurality of equally spaced parallel measurement lines applied to a surface of said object, said measurement lines oriented perpendicular to said flight path.

* * * * *